US008542942B2

(12) United States Patent
Wong et al.

(10) Patent No.: US 8,542,942 B2
(45) Date of Patent: Sep. 24, 2013

(54) TUNABLE GAUSSIAN FILTERS

(75) Inventors: Earl Wong, San Jose, CA (US); Akira Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 12/971,105

(22) Filed: Dec. 17, 2010

(65) Prior Publication Data

US 2012/0154641 A1 Jun. 21, 2012

(51) Int. Cl.
*G06K 9/40* (2006.01)

(52) U.S. Cl.
USPC .............................. 382/264; 382/260; 382/261

(58) Field of Classification Search
USPC .......................................... 382/260, 261, 264
See application file for complete search history.

(56) References Cited

U.S. PATENT DOCUMENTS

| 6,457,032 | B1 | 9/2002 | Silver | |
|---|---|---|---|---|
| 7,982,734 | B2 * | 7/2011 | Miller | 345/426 |
| 2001/0043722 | A1 | 11/2001 | Wildes et al. | |
| 2003/0190090 | A1 * | 10/2003 | Beeman et al. | 382/284 |
| 2004/0234159 | A1 | 11/2004 | Wang | |
| 2007/0116373 | A1 | 5/2007 | Hwang et al. | |
| 2011/0194772 | A1 * | 8/2011 | SanJuan et al. | 382/190 |

FOREIGN PATENT DOCUMENTS

WO  2006084150 A3  8/2006

OTHER PUBLICATIONS

Belt, H. J. W.; Word length reduction for the integral image; Oct. 2008; 15th IEEE International Conference on Image Processing, 2008; pp. 1-4.*
Chaudhury et al, Fast Space-Variant Elliptical Filtering Using Box Splines, Sep. 2010, IEEE Transactions on Image Processing, vol. 19, pp. 1-35.*
Garner, Harvey, Theory of Computer Addition and Overflows, Apr. 1978, IEEE Transactions on Computers, vol. c-27, pp. 1-5.*
Geusebroek et al, Fast Anisotropic Gauss Filtering, Aug. 2003, IEEE Transactions on Image Processing, vol. 12, pp. 1-6.*
Wojciech Jarosz, "Fast Image Convolutions", 2001, http://elynxsdk.free.fr/ext-docs/Blur/Fast_box_blur.pdf.*
Rau, R.; McClellan, J.H., "Efficient approximation of Gaussian filters," Signal Processing, IEEE Transactions on , vol. 45, No. 2, pp. 468,471, Feb. 1997.*
Andrade-Cetto et al., "Object Recognition" pp. 1-49.
Freeman et al., "The Design and Use of Streerable Filters", IEEE Transactions on Pattern Analasys and Machine Intelligence, vol. 13, No. 9, Sep. 1, 1991, pp. 891-906.
Simoncelli et al., "SteerableWedge Filters for Local Orientation Analysis", IEEE Transactions on Image Processing,5(9), pp. 1-10.
Daniel Huttenlocher, "Speeding Up Belief Propagation for Early Vision", MSRI Low Level Vision Workshop Feb. 1, 2005, pp. 1-36.
Paul S. Heckbert, "Fundamentals of Texture Mapping and Image Warping", Jun. 17, 1989, pp. 1-94.
Chaudhury et al., "Fast space-variant elliptical filtering using box splines", IEEE Trans. Image Processing, pp. 1-35.

(Continued)

*Primary Examiner* — Utpal Shah
(74) *Attorney, Agent, or Firm* — Haverstock & Owens LLP

(57) ABSTRACT

Tunable Gaussian filters enable imaging effects to be applied to images and videos in orientations other than standard symmetric, 0 degree orientations and 90 degree orientations. The tunable Gaussian filters are able to be applied in any orientation such as 45 degrees, slightly less than 45 degrees and slightly more than 0 degrees.

36 Claims, 15 Drawing Sheets

(56) References Cited

OTHER PUBLICATIONS

Yuan et al., "A Simplified Realization for the Gaussian Filter in Surface Metrology", Jan. 31-Feb. 2, 2000, pp. 133-144.
William M. Wells, III, "Efficient Synthesis of Gaussian Filters by Cascaded Uniform Filters", IEEE Transactions on Pattern Analysis and Machine Intelligence, vol. PAMI-8, No. 2, Mar. 1, 1986, pp. 234-239.
Farabet et al., "An FPGA-Based Stream Processor for Embedded Real-Time Vision With Convolution Networks", Sep. 2009, IEE 12th International Conference on Computer Vision Workshops, 2009; pp. 1-8.

* cited by examiner

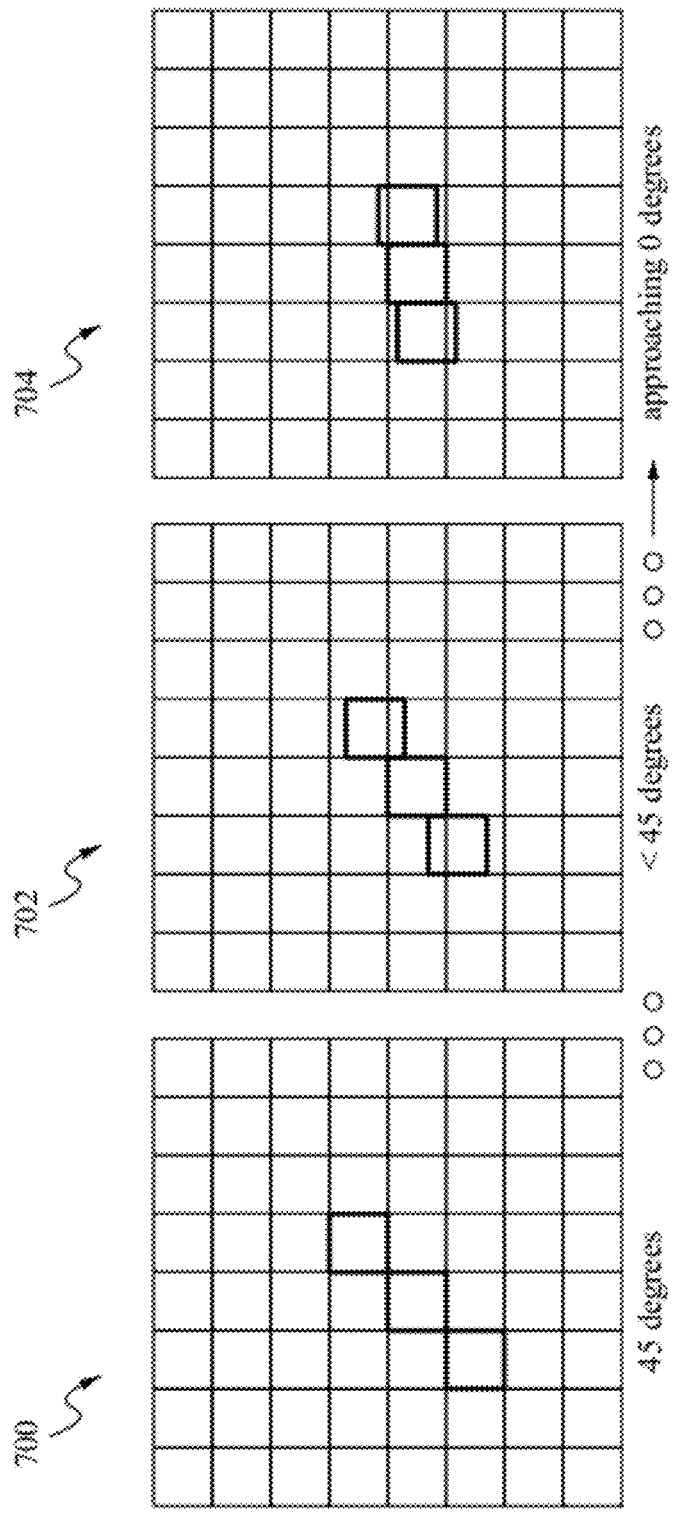
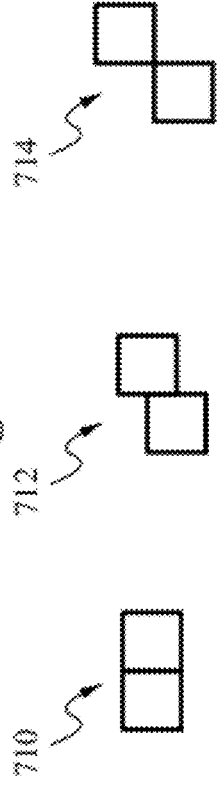

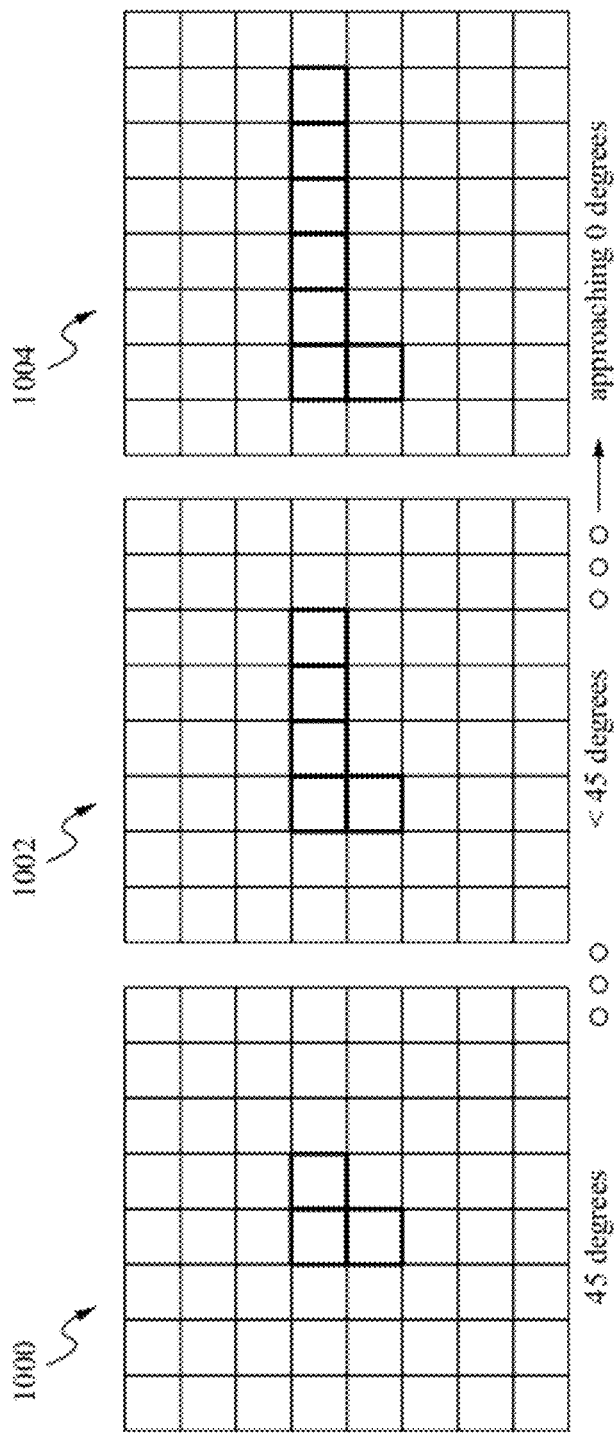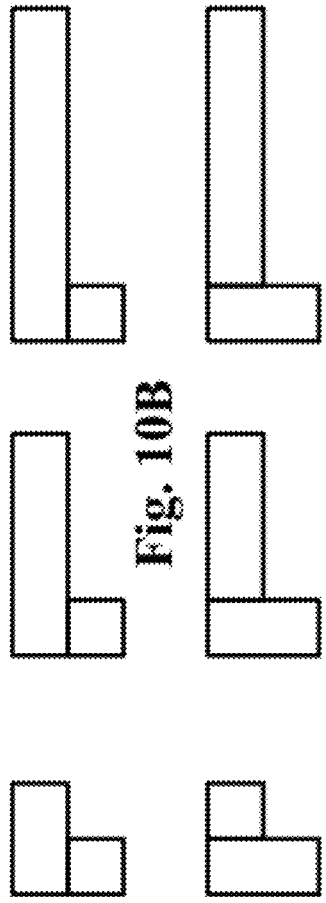
Fig. 10A
Fig. 10B
Fig. 10C

TUNABLE GAUSSIAN FILTERS

FIELD OF THE INVENTION

The present invention relates to the field of image/video processing. More specifically, the present invention relates to tunable Gaussian filters.

BACKGROUND OF THE INVENTION

Oriented filters are used in many image processing tasks, such as texture analysis, edge detection, image data compression, motion analysis and image enhancement. Unfortunately, filters have been implemented in standard orientations such as a 0 degree orientation, a 90 degree orientation or a symmetric orientation.

SUMMARY OF THE INVENTION

Tunable Gaussian filters enable imaging effects to be applied to images and videos in orientations other than standard symmetric, 0 degree orientations and 90 degree orientations. The tunable Gaussian filters are able to be applied in any orientation such as 45 degrees, slightly less than 45 degrees and slightly more than 0 degrees.

In one aspect, a method of implementing a tunable Guassian filter programmed in a memory in a device comprises configuring a set of filter templates and iterating the filter templates to generate a Gaussian filter. The set of filter templates are box filter templates. The set of filter templates are configured in an orientation to generate a Gaussian filter between 0 and 45 degrees. The set of filter templates are configured at an angle greater than 0 degrees and less than or equal to 45 degrees from each other. The set of filter templates comprise at least two box filter templates of square and/or rectangular shapes wherein at least two box filter templates are configured in a row and a box filter template is configured below a leftmost box filter template in the row. A fast implementation of a box filter template is used to configure an orientation of the set of filter templates. The fast implementation of the box filter template includes using a summed table. Overflow computing is implemented in conjunction with the fast implementation of the box filter template. The Gaussian filter is applied to an image to generate a filtered image. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, a system for implementing a tunable Guassian filter programmed in a memory in a device comprises a configuring module for configuring box filter templates into an orientation and an iteration module for iterating the box filter templates to generate a Gaussian filter. The box filter templates are configured in an orientation to generate a Gaussian filter between 0 and 45 degrees. The box filter templates are configured at an angle greater than 0 degrees and less than or equal to 45 degrees from each other. The box filter templates comprise at least two box filter templates of square and/or, rectangular, shapes wherein at least two box filter templates are configured in a row and a box filter template is configured below a leftmost box filter template in the row. A fast implementation of the box filter templates is used to configure an orientation of the set of filter templates. The fast implementation of the box filter template includes using a summed table. Overflow computing is implemented in conjunction with the fast implementation of the box filter template. The Gaussian filter is applied to an image to generate a filtered image. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

A camera device comprises an image acquisition component for acquiring an image, a processing component for processing the image by configuring box filter templates at an angle greater than 0 degrees and less than or equal to 45 degrees from each other, iterating the box filter templates to generate a Gaussian filter oriented greater than 0 degrees and less than or equal to 45 degrees and applying the Gaussian filter to the image to generate a processed image and a memory for storing the processed image. The box filter templates comprise at least two box filter templates of square and/or rectangular shapes wherein at least two box filter templates are configured in a row and a box filter template is configured below a leftmost box filter template in the row. A fast implementation of the box filter templates is used to configure an orientation of the set of filter templates. The fast implementation of the box filter template includes using a summed table. Overflow computing is implemented in conjunction with the fast implementation of the box filter template.

In another aspect, a method of implementing a tunable Guassian filter programmed in a memory in a device comprises configuring a set of at least two box filter templates of square and/or rectangular shapes, wherein the set of at least two box filter templates are oriented using a fast implementation of the box filter templates and overflow computing, iterating the set of at least two box filter templates to generate a Gaussian filter and applying the Gaussian filter to an image to generate a filtered image. The set of at least two filter templates are configured in an orientation to generate a Gaussian filter between 0 and 45 degrees. The set of at least two filter templates are configured at an angle greater than 0 degrees and less than or equal to 45 degrees from each other. The set of at least two filter templates comprise at least two box filter templates are configured in a row and a box filter template is configured below a leftmost box filter template in the row. The fast implementation of the box filter template includes using a summed table. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In yet another aspect, an apparatus comprises a processing component for processing an image by configuring a set of at least two box filter templates of square and/or rectangular shapes, wherein the set of at least two box filter templates are oriented using a fast implementation of the box filter templates and overflow computing, iterating the set of at least two box filter templates to generate a Gaussian filter and applying the Gaussian filter to the image to generate a filtered image and a memory for storing the filtered image. The set of at least two filter templates are configured in an orientation to generate a Gaussian filter between 0 and 45 degrees. The set of at least two filter templates are configured at an angle greater than 0 degrees and less than or equal to 45 degrees from each other. The set of at least two filter templates comprise at least two box filter templates are configured in a row and a box filter template is configured below a leftmost box filter template in the row. The fast implementation of the box filter template includes using a summed table.

BRIEF DESCRIPTION OF THE DRAWINGS

FIGS. 7A-B illustrate a family of Guassian filters tuned to orientations between 0 and 45 degrees.
FIGS. 10A-C illustrate a family of Guassian filters tuned to orientations between 0 and 45 degrees.

DETAILED DESCRIPTION OF THE PREFERRED EMBODIMENT

The concept of summed tables have been used to obtain rapid performance speed up for a variety of image processing tasks. Examples include: box filters, $n^{th}$ order derivative filters, wavelet basis functions and others. There are methods to realize high accuracy/minimal hardware Gaussian filters by iteratively applying a summed table implementation of the box filter and "overflow computing." Depending on the shape of the box filter; symmetric, x-direction and y-direction filters are able to be easily realized.

Figure 1:
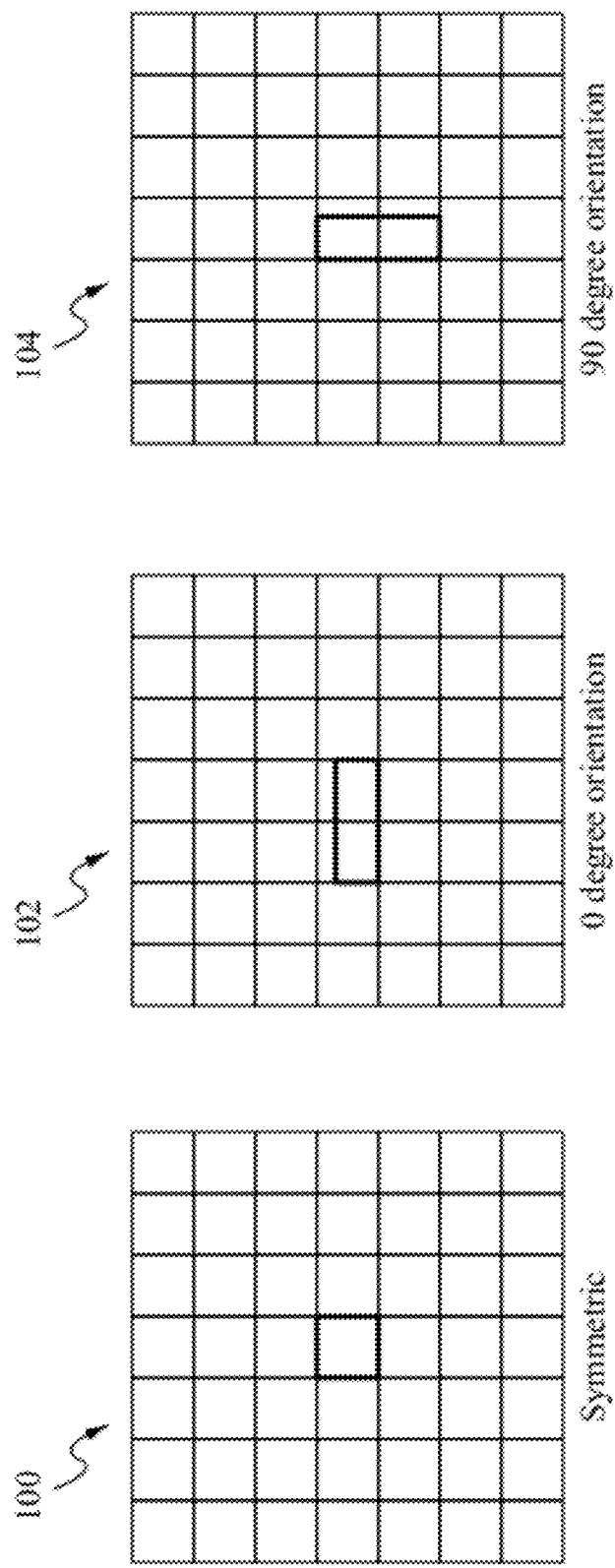
FIG. 1 illustrates fundamental filter templates.
Figure 2:
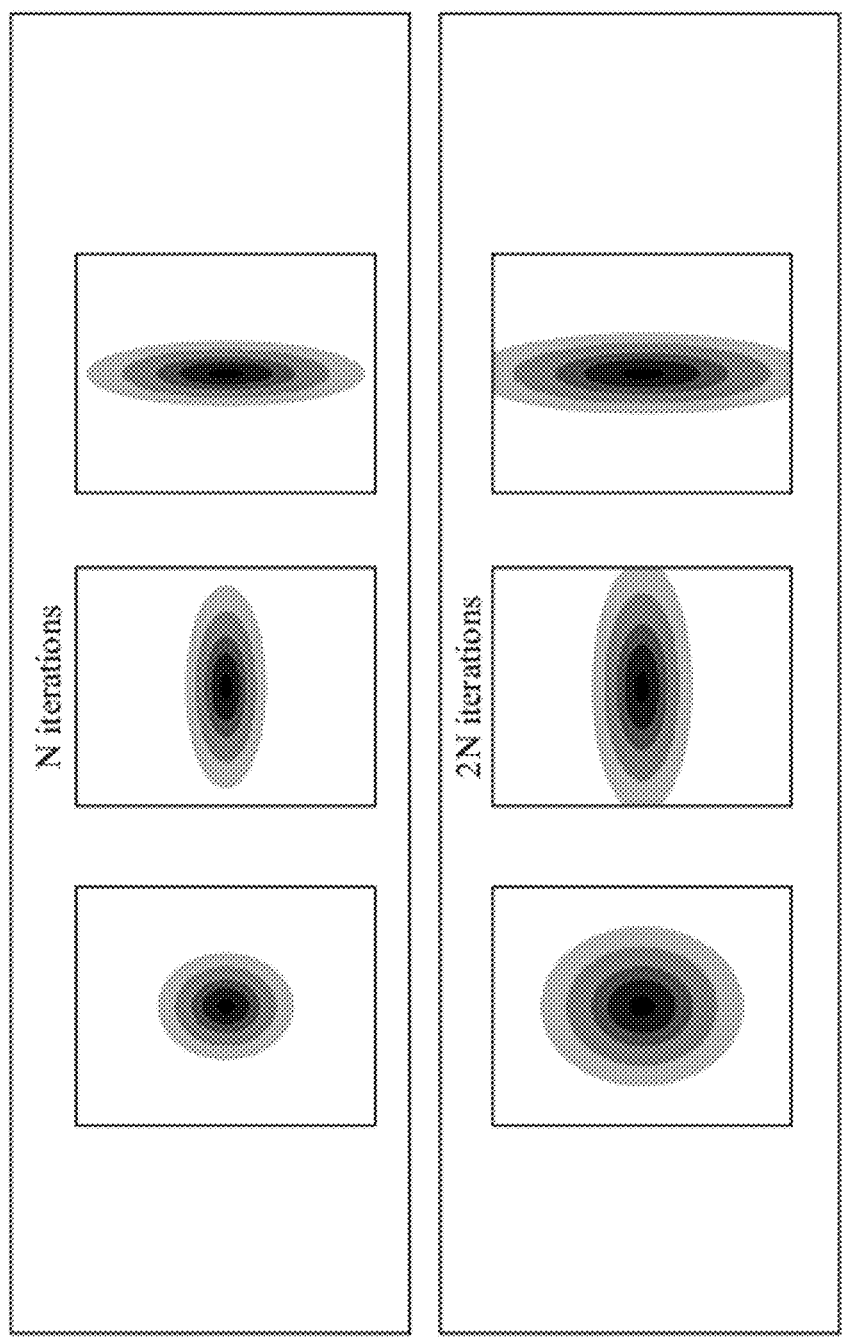
FIG. 2 illustrates the results of the filter templates after N iterations and 2N iterations.
Figure 3:
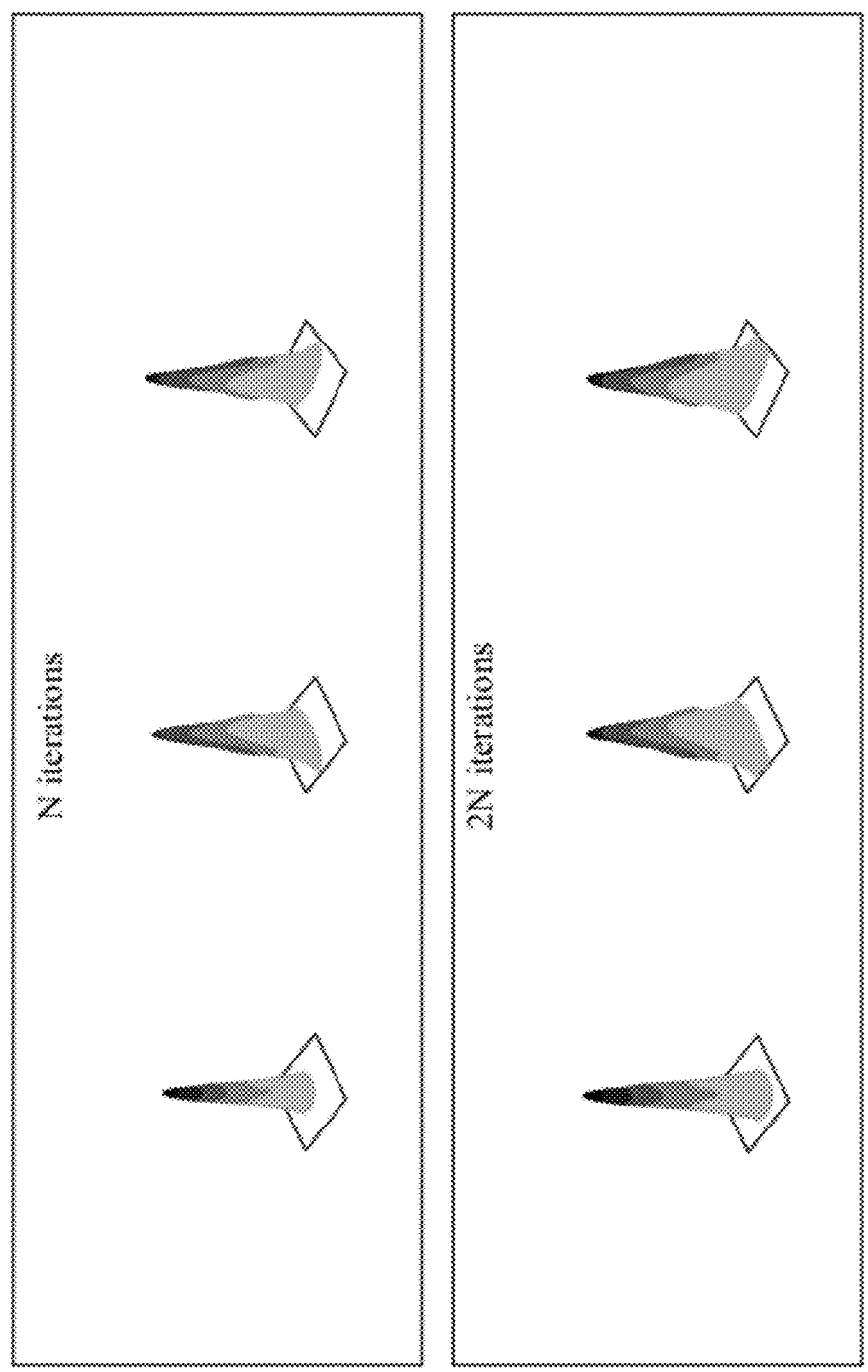
FIG. 3 illustrates the results in graph form after N iterations and 2N iterations.

Fundamental filter templates are shown in FIG. 1. Filter 100 is a symmetric filter. Filter 102 is a filter with a 0 degree orientation. Filter 104 is a filter with a 90 degree orientation. In FIG. 1, each square is of dimension n×n. The results of the filter templates after N iterations and 2N iterations are shown in FIG. 2. Additionally, the results in graph form after N iterations and 2N iterations are shown in FIG. 3.

Although Gaussian filters are generally symmetric, it would be advantageous to be able to have Gaussian filters oriented in various angular directions. Tunable/steerable filters are of great value in the image processing community.

By generating the appropriate basis functions such as:

$$G_1^{0*} = \frac{\partial}{\partial x} e^{-(x^2+y^2)} = -2xe^{-(x^2+y^2)}$$

$$G_1^{90*} = \frac{\partial}{\partial y} e^{-(x^2+y^2)} = -2ye^{-(x^2+y^2)},$$

steerable Gaussian filters are able to be realized. The Gaussian portion of each basis function is obtained via a summed table method such as the method described in U.S. patent application Ser. No. 12/906,812, filed Oct. 18, 2010, and entitled, "FAST, ACCURATE AND EFFICIENT GAUSSIAN FILTER," which is incorporated by reference herein.

Figure 4:
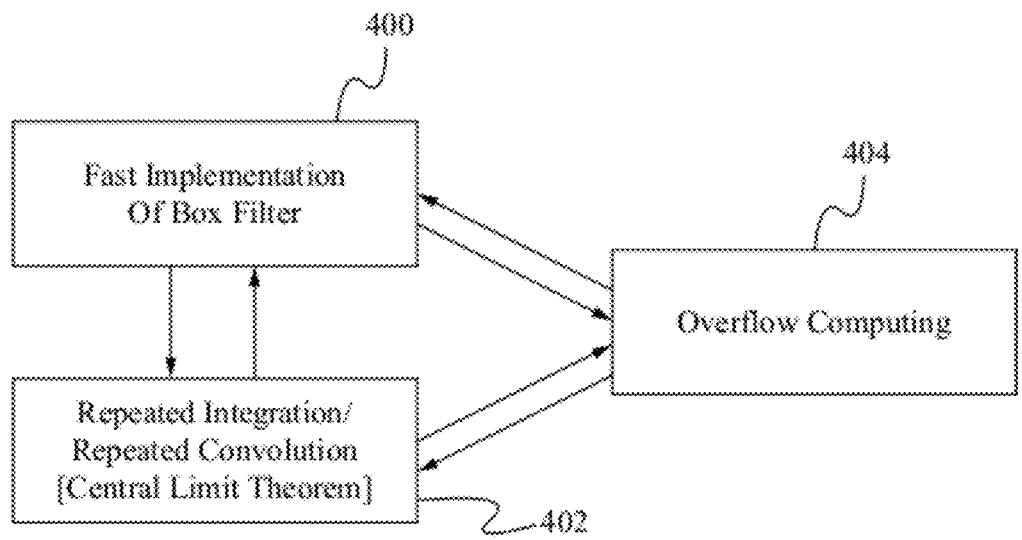
FIG. 4 illustrates a general block diagram of each component of the fast, accurate and efficient Gaussian filter.

To improve image filtering, fast implementation of a box filter is used in conjunction with repeated integration/repeated convolution and overflow computing. FIG. 4 illustrates a general block diagram of each component of the fast, accurate and efficient Gaussian filter. A fast implementation of a box filter 400 is used. Then, repeated integration/repeated convolution 402 is implemented. Additionally, overflow computing 404 assists to ensure an efficient process.

Figure 5:
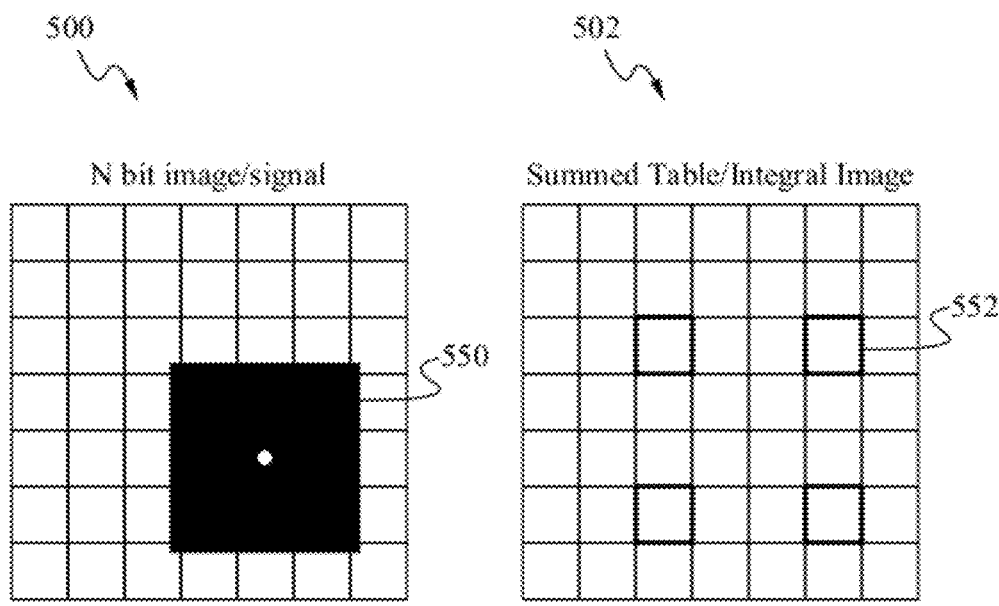
FIG. 5 illustrates a diagram of a direct convolution and a box filter according to some embodiments.

FIG. 5 illustrates a diagram of a direct convolution and a box filter according to some embodiments. Here, each square represents a single pixel (e.g. n×n=1×1). A 3×3 box filter convolution is performed for the center pixel in the shaded area 550 of the N bit image 500 by convolving the pixels in the shaded area 550 with [111; 111; 111]. This is also referred to as a direct convolution.

To perform the same 3×3 box filter convolution, the selected elements 552 of the summed table/integral image 502 are computed: b66+b33−b63−b36. This is referred to as a fast convolution or a fast implementation of a box filter. Although a 3×3 box filter convolution is described, any size box filter is able to be implemented. In some embodiments, the size of the box filter is arbitrarily chosen.

A repeated convolution of any filter with itself eventually produces a Gaussian-shaped filter. Therefore, by repeatedly convolving the same box filter several times, the Gaussian-shaped filter counterpart is able to be realized.

Figure 6:
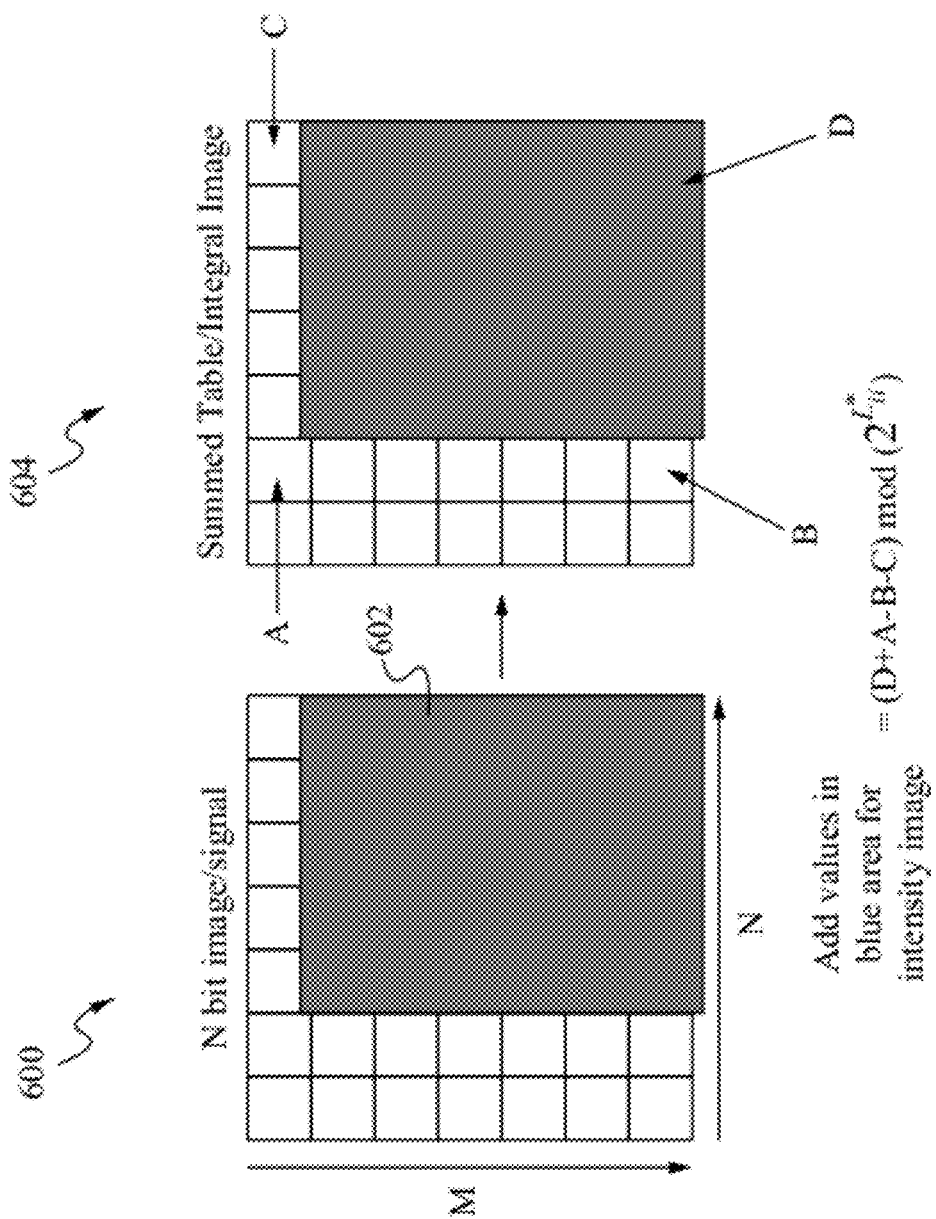
FIG. 6 illustrates a diagram overflow computing using a modulo sum table according to some embodiments.

FIG. 6 illustrates a diagram overflow computing using a modulo sum table according to some embodiments. The sum of the values for a shaded area 602 of the n bit image 600 equal specific points in the modulo sum table 604 such that the equation is: intensity image=(D+A−B−C)mod$_2$. By using the modulo sum table 604, the values to be added are much smaller than the actual values, but the result is still the same, thus avoiding the overflow issue.

FIG. 7A illustrates a family of Gaussian filters tuned to orientations between 0 and 45 degrees. A 45 degree Gaussian filter is shown in graph 700. The 45 degree Gaussian filter is generated by iterating several box filter templates oriented at a 45 degree angle from each other. A less than but close to 45 degree Gaussian filter is shown in graph 702. The less than but close to 45 degree Gaussian filter is generated by iterating several box filter templates oriented at an angle slightly less than 45 degrees from each other. A Gaussian filter approaching 0 degrees is shown in graph 704. The Gaussian filter approaching 0 degrees is generated by iterating several box filter templates oriented at an angle slightly more than 0 degrees from each other.

FIG. 7B illustrates a family of Gaussian filters tuned to orientations between 0 and 45 degrees. A 45 degree Gaussian filter is shown in graph 714. The 45 degree Gaussian filter is generated by iterating two box filter templates oriented at a 45 degree angle from each other. A less than 45 degree Gaussian filter is shown in graph 712. The less than 45 degree Gaussian filter is generated by iterating two box filter templates oriented at an angle less than 45 degrees from each other. A Gaussian filter of 0 degrees is shown in graph 710. The Gaussian filter of 0 degrees is generated by iterating two box filter templates oriented at an angle of 0 degrees from each other.

Figure 8:
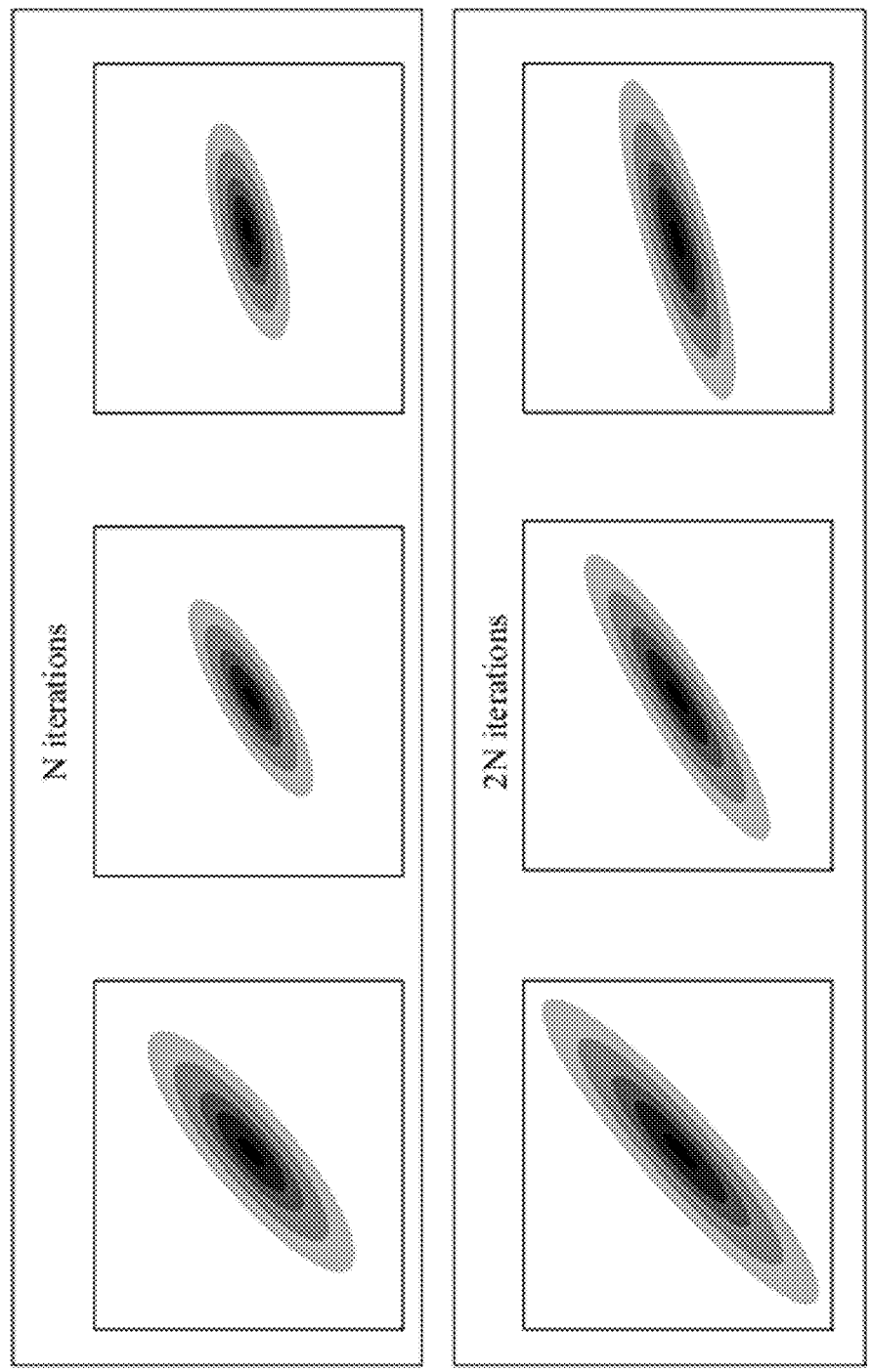
FIG. 8 illustrates the results of the filter templates after N iterations and 2N iterations.
Figure 9:
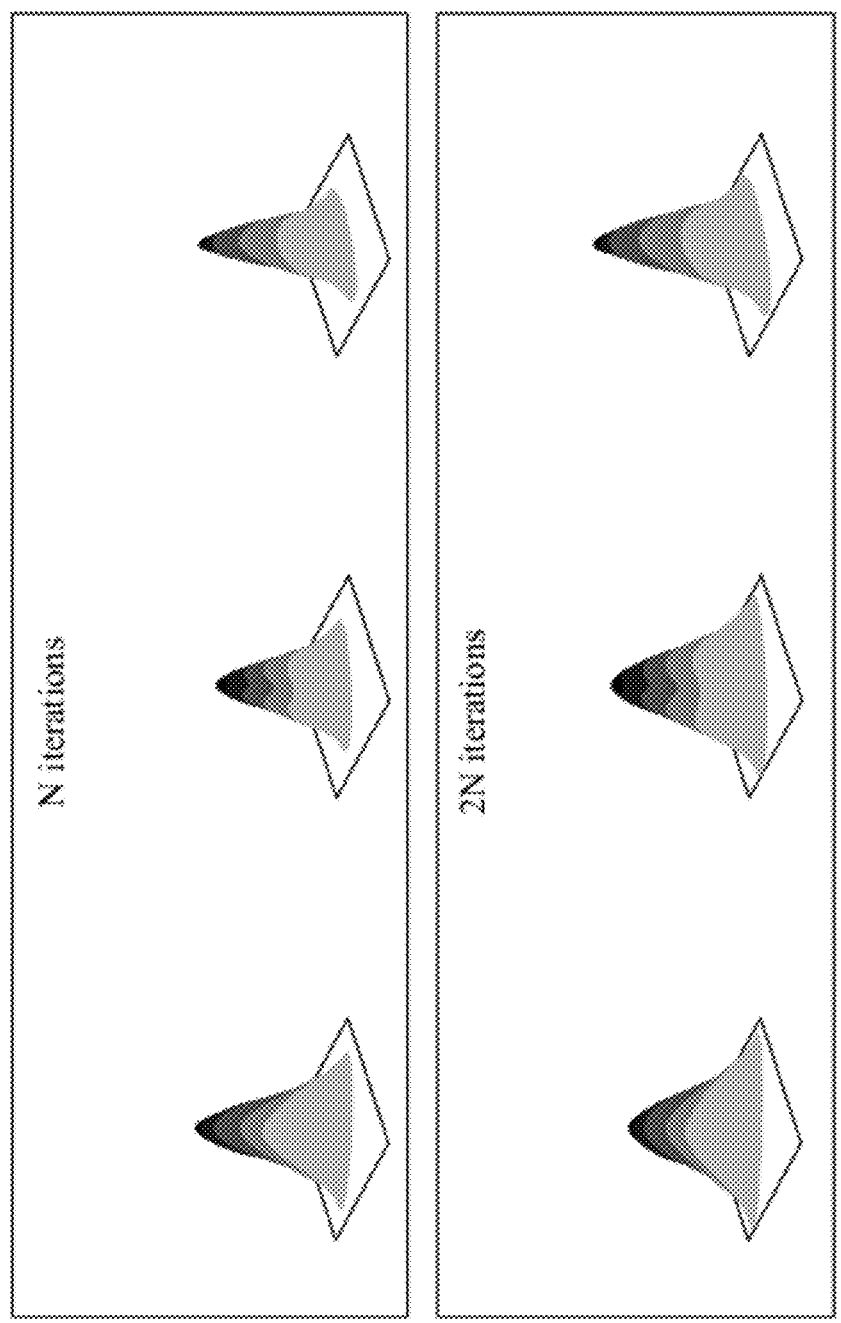
FIG. 9 illustrates the results in graph form after N iterations and 2N iterations.

The results of the filter templates shown in FIG. 7A after N iterations and 2N iterations are shown in FIG. 8. Additionally, the results in graph form after N iterations and 2N iterations are shown in FIG. 9.

FIG. 10 illustrates a family of Guassian filters tuned to orientations between 0 and 45 degrees. A 45 degree Guassian filter is shown in graph 1000. The 45 degree Gaussian filter is generated by iterating several box filter templates oriented with one box filter template to the right of a center box filter template and one box filter template below the center box filter template. A less than but close to 45 degree Gaussian filter is shown in graph 1002. The less than but close to 45 degree Gaussian filter is generated by iterating several box filter templates oriented with several (e.g. 3) box filter templates to the right of a center box filter template and one box filter template below the center box filter template. A Gaussian filter approaching 0 degrees is shown in graph 1004. The Gaussian filter approaching 0 degrees is generated by iterating several box filter templates oriented with many (e.g. 5) box filter templates to the right of a center box filter templates and one box filter template below the center box filter template. In other words, the Gaussian filters are generated by iterating a row of box filter templates with one box filter template below the leftmost box filter template, and as the row gets longer, the angle approaches 0 degrees. FIG. 10B illustrates an alternative embodiment of a family of Guassian filters tuned to orientations between 0 and 45 degrees. FIG. 10C illustrates an alternative embodiment of a family of Guassian filters tuned to orientations between 0 and 45 degrees.

Figure 11:
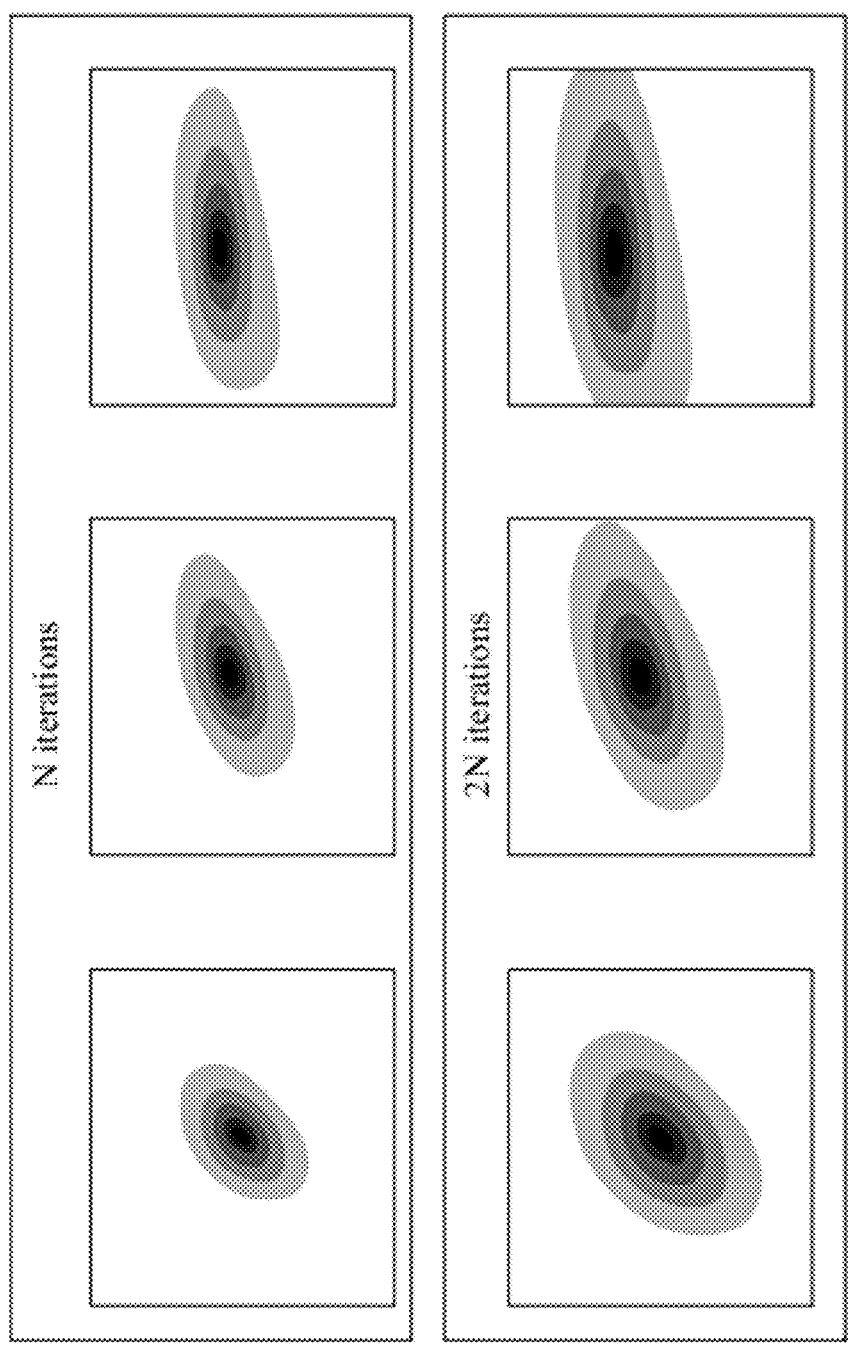
FIG. 11 illustrates the results of the filter templates after N iterations and 2N iterations.
Figure 12:
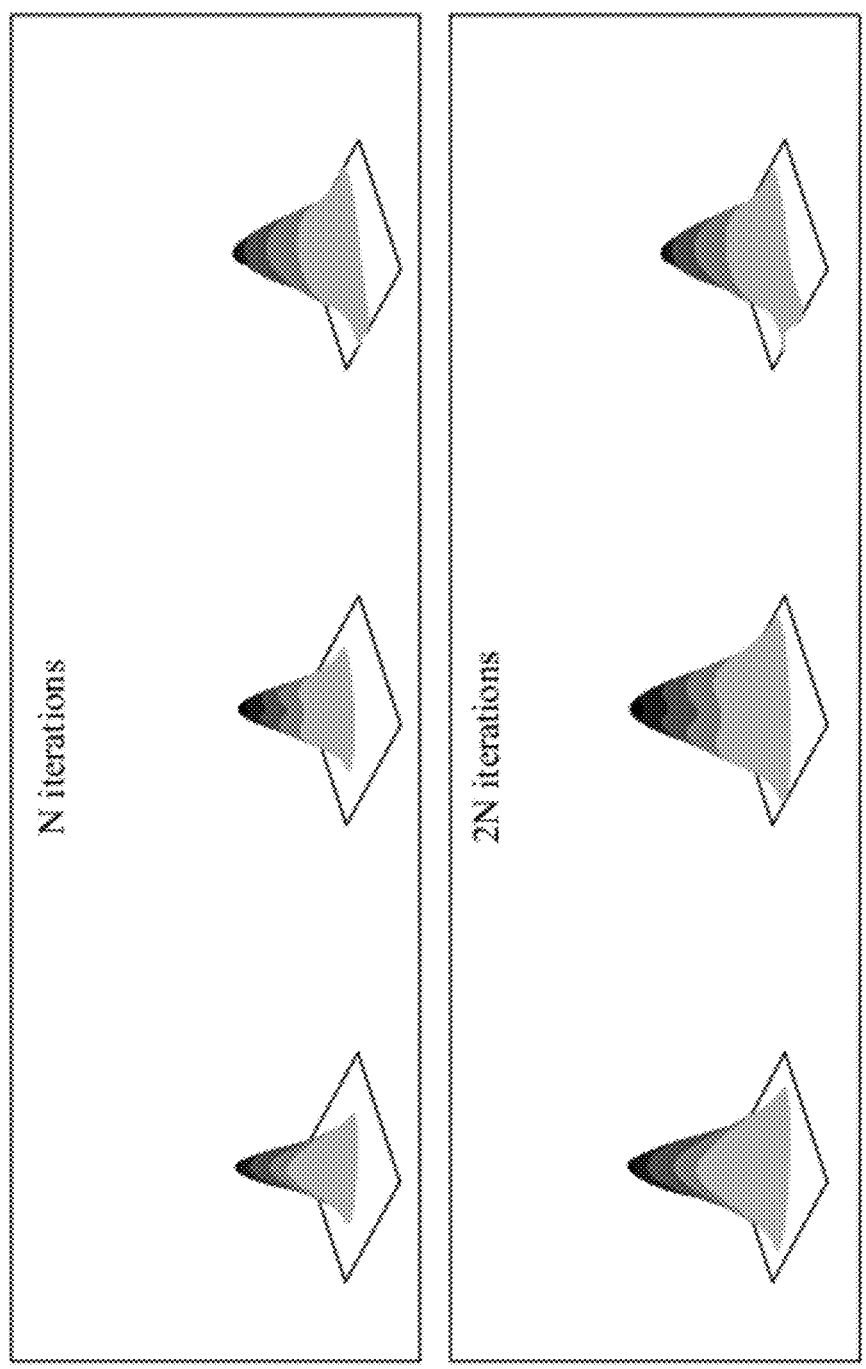
FIG. 12 illustrates the results in graph form after N iterations and 2N iterations.

The results of the filter templates after N iterations and 2N iterations are shown in FIG. 11. Additionally, the results in graph form after N iterations and 2N iterations are shown in FIG. 12.

In addition to Gaussian filters tuned to orientations between 0 and 45 degrees additional orientations are possible as well from 0 to 360 degrees.

Using the idea of tunable filters, it is possible to vary the orientation of the applied Gaussian filter at any image location. This is achieved by generating structures that include a superposition of the fundamental box filter template. Although a square template has been described herein, any shaped template is usable. To generate "energy conserving" filters, the area of the template remains constant and is orientation independent.

Figure 13:
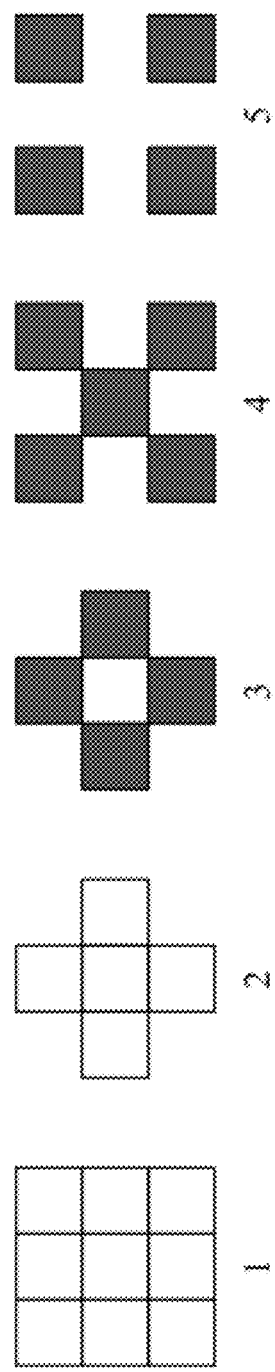
FIG. 13 illustrates examples of Gaussian filters when iterated that will produce a symmetric Gaussian function according to some embodiments.

FIG. 13 illustrates examples of Gaussian filters that when iterated will produce a symmetric Gaussian function according to some embodiments. Because of the central limit theorem, there are many possible embodiments for realizing Gaussian filters. The embodiment 1000 minimizes the number of individual pieces/fragments while maximizing a continuous rectangular/square footprint.

Figure 14:
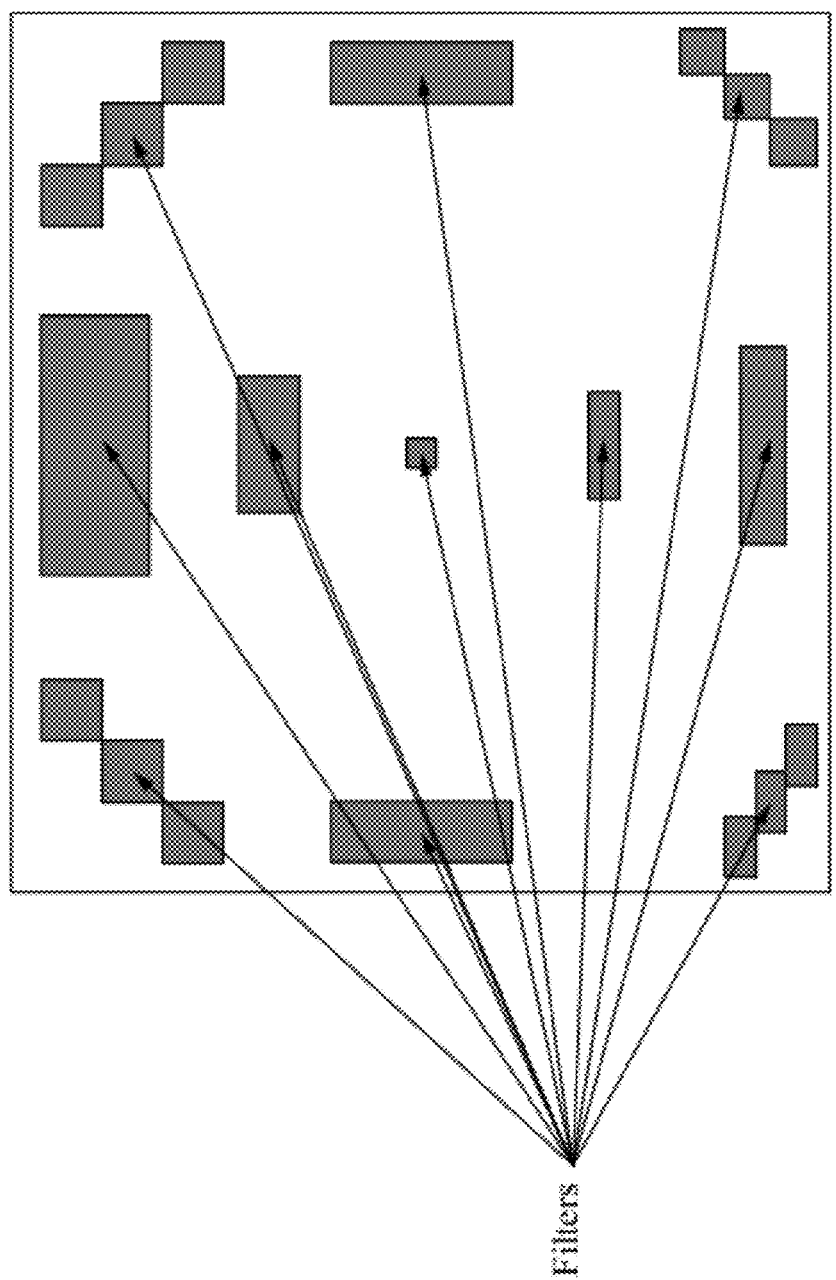
FIG. 14 illustrates an example of utilizing Gaussian filters according to some embodiments.

FIG. 14 illustrates an example of utilizing Gaussian filters according to some embodiments. The filters are applied at the locations shown. Stronger Gaussian filters are applied at the top of the image. The filter at the upper left corner, the upper right corner and the lower right corner are oriented at a 45 degree angle. The filter at the lower left corner is oriented at an "off 45 degree" angle.

Figure 15:
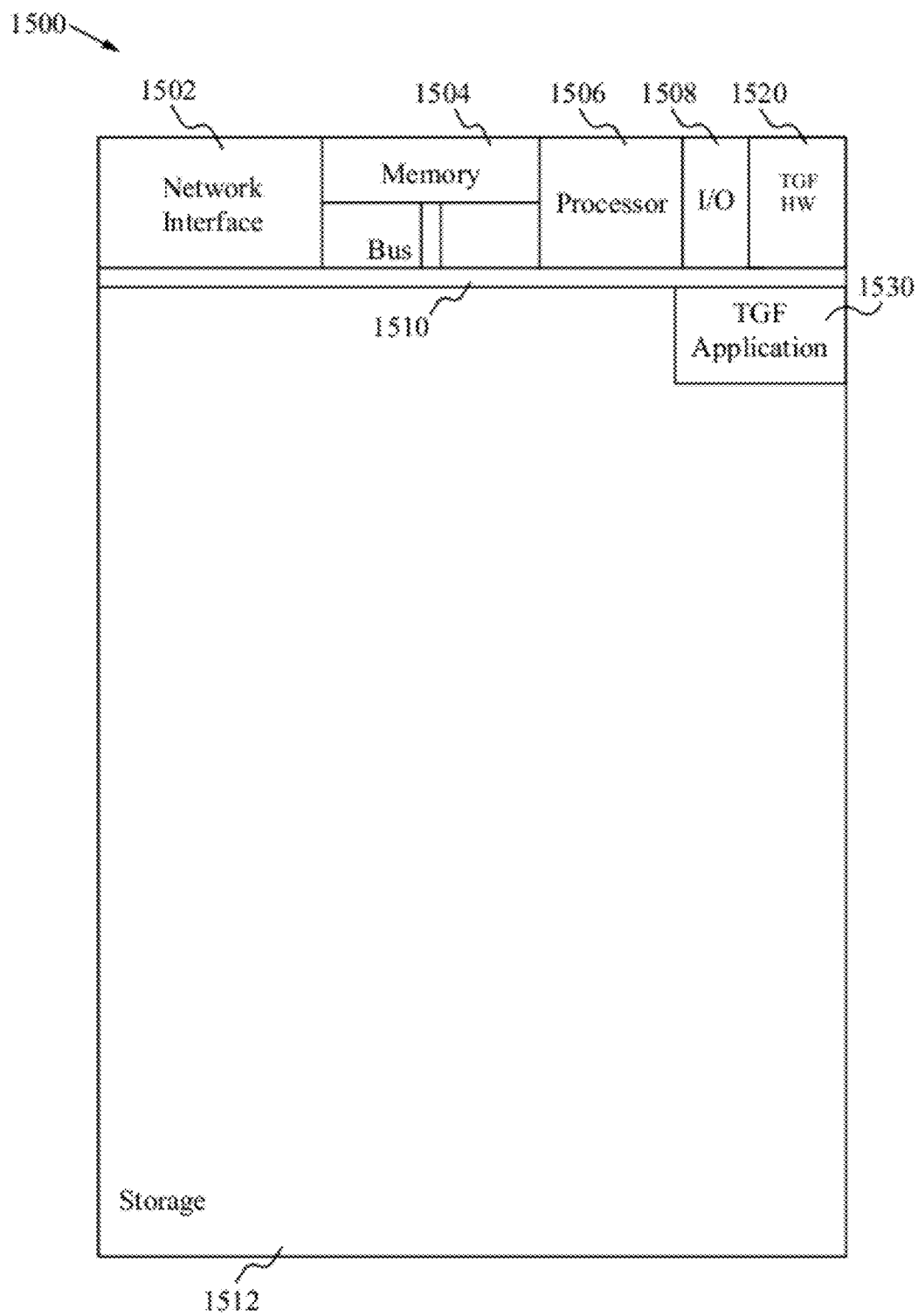
FIG. 15 illustrates a block diagram of an exemplary computing device configured to implement motion compensated inter prediction according to some embodiments.

FIG. 15 illustrates a block diagram of an exemplary computing device 1500 configured to implement tunable Gaussian filters according to some embodiments. The computing device 1500 is able to be used to process information such as images and videos. For example, a computing device 1500 is able to process an image using the tunable Gaussian filters. In general, a hardware structure suitable for implementing the computing device 1500 includes a network interface 1502, a memory 1504, a processor 1506, I/O device(s) 1508, a bus 1510 and a storage device 1512. The choice of processor is not critical as long as a suitable processor with sufficient speed is chosen. The memory 1504 is able to be any conventional computer memory known in the art. The storage device 1512 is able to include a hard drive, CDROM, CDRW, DVD, DVDRW, Blu-ray Disc™, flash memory card or any other storage device. The computing device 1500 is able to include one or more network interfaces 1502. An example of a network interface includes a network card connected to an Ethernet or other type of LAN. The I/O device(s) 1508 are able to include one or more of the following: keyboard, mouse, monitor, display, printer, modem, touchscreen, button interface and other devices. Tunable Gaussian filter application(s) 1530 used to implement the tunable Gaussian filters are likely to be stored in the storage device 1512 and memory 1504 and processed as applications are typically processed. More or less components than shown in FIG. 15 are able to be included in the computing device 1500. In some embodiments, tunable Gaussian filter hardware 1520 is included. Although the computing device 1500 in FIG. 15 includes applications 1530 and hardware 1520 for implementing tunable Gaussian filters, the tunable Gaussian filters are able to be implemented on a computing device in hardware, firmware, software or any combination thereof.

In some embodiments, the tunable Gaussian filter application(s) 1530 include several applications and/or modules. In some embodiments, the tunable Gaussian filter application(s) 1530 include modules such as a configuring module for configuring filter templates into a desired orientation and an iteration module for iterating the filter templates to generate a Gaussian result. In some embodiments, fewer or additional modules and/or sub-modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-Ray® writer/player, a television, a home entertainment system or any other suitable computing device.

Figure 16:
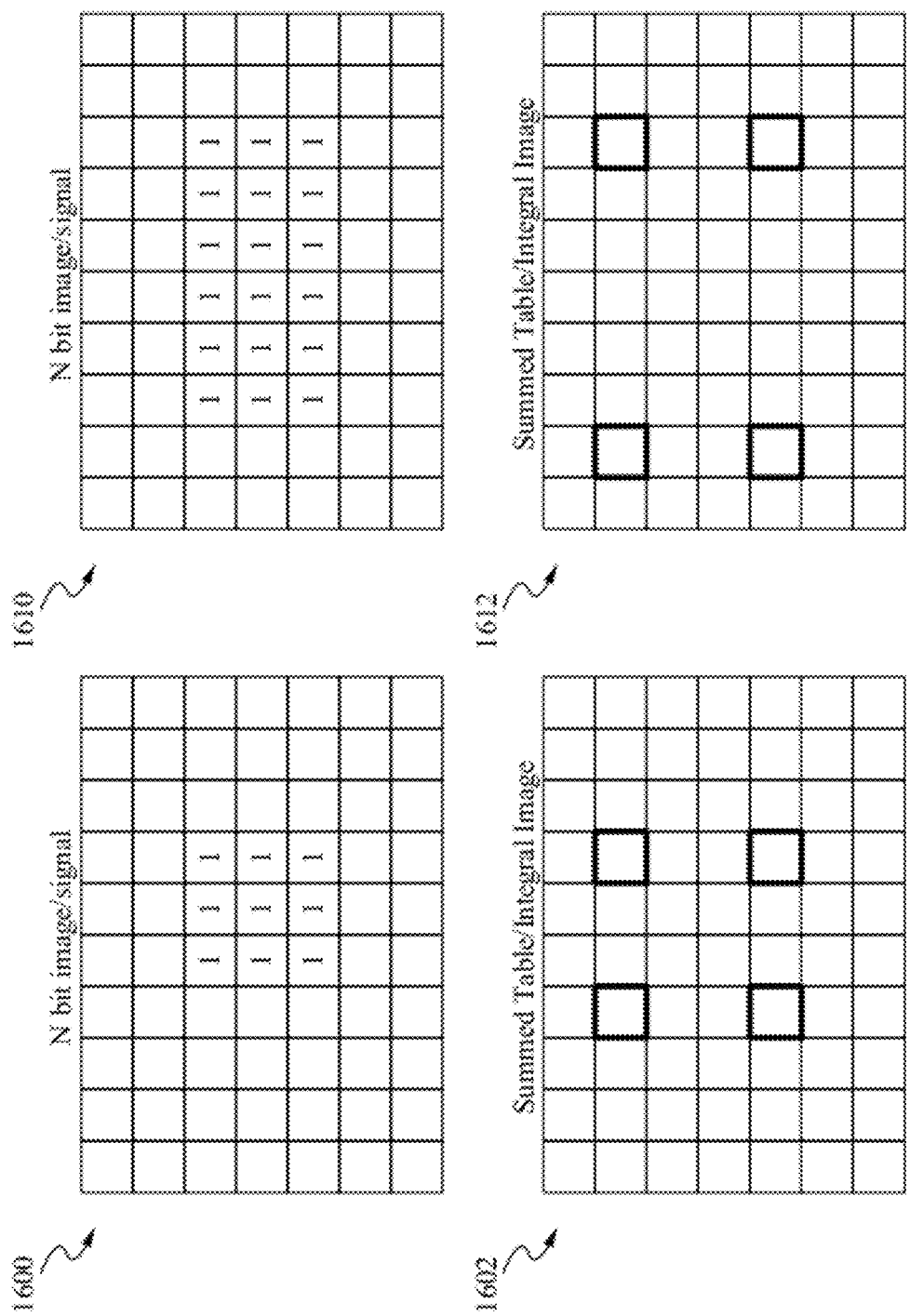
FIG. 16 illustrates a diagram of a box filter and a double-sized box filter according to some embodiments.

FIG. 16 illustrates a diagram of a box filter and a double-sized box filter according to some embodiments. The [111, 111,111] in the graph 1600 is able to be applied twice to generate [111111, 111111, 111111] or the [111111, 111111, 111111] is able to be applied all at once as shown in the graph 1610. A box filter 1602 for [111,111,111] and a box filter 1612 for [111111, 111111, 111111] are shown.

To utilize motion tunable Gaussian filters, a device such as a digital camera or camcorder is used to acquire an image or video of a scene. The tunable Gaussian filters are able to be automatically implemented or manually selected by a user. The tunable Gaussian filters are also able to be implemented after the image is acquired to perform post-acquisition processing.

In operation, the tunable Gaussian filters are able to be used with images and videos to provide smoothing, blurring or another effect. The tunable Gaussian filters also enable filtering in orientations other than standard symmetric, 0 degree orientations and 90 degree orientations. The tunable Gaussian filters enable any orientation. Furthermore, by utilizing summed tables and overflow computing, the Gaussian filters are able to be computed very efficiently.

Some Embodiments of Tunable Gaussian Filters

1. A method of implementing a tunable Guassian filter programmed in a memory in a device comprising:
   a. configuring a set of filter templates; and
   b. iterating the filter templates to generate a Gaussian filter.
2. The method of clause 1 wherein the set of filter templates are box filter templates.
3. The method of clause 1 wherein the set of filter templates are configured in an orientation to generate a Gaussian filter between 0 and 45 degrees.
4. The method of clause 1 wherein the set of filter templates are configured at an angle greater than 0 degrees and less than or equal to 45 degrees from each other.
5. The method of clause 1 wherein the set of filter templates comprise at least two box filter templates of square and/or rectangular shapes wherein at least two box filter templates are configured in a row and a box filter template is configured below a leftmost box filter template in the row.
6. The method of clause 1 wherein a fast implementation of a box filter template is used to configure an orientation of the set of filter templates.
7. The method of clause 6 wherein the fast implementation of the box filter template includes using a summed table.
8. The method of clause 7 wherein overflow computing is implemented in conjunction with the fast implementation of the box filter template.
9. The method of clause 1 wherein the Gaussian filter is applied to an image to generate a filtered image.
10. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
11. A system for implementing a tunable Guassian filter programmed in a memory in a device comprising:
    a. a configuring module for configuring box filter templates into an orientation; and
    b. an iteration module for iterating the box filter templates to generate a Gaussian filter.
12. The system of clause 11 wherein the box filter templates are configured in an orientation to generate a Gaussian filter between 0 and 45 degrees.
13. The system of clause 11 wherein the box filter templates are configured at an angle greater than 0 degrees and less than or equal to 45 degrees from each other.
14. The system of clause 11 wherein the box filter templates comprise at least two box filter templates square and/or rectangular shapes wherein at least two box filter templates are configured in a row and a box filter template is configured below a leftmost box filter template in the row.
15. The system of clause 11 wherein a fast implementation of the box filter templates is used to configure an orientation of the set of filter templates.
16. The system of clause 15 wherein the fast implementation of the box filter template includes using a summed table.
17. The system of clause 16 wherein overflow computing is implemented in conjunction with the fast implementation of the box filter template.
18. The system of clause 11 wherein the Gaussian filter is applied to an image to generate a filtered image.
19. The system of clause 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
20. A camera device comprising:
    a. an image acquisition component for acquiring an image;
    b. a processing component for processing the image by:
       i. configuring box filter templates at an angle greater than 0 degrees and less than or equal to 45 degrees from each other;
       ii. iterating the box filter templates to generate a Gaussian filter oriented greater than 0 degrees and less than or equal to 45 degrees; and
       iii. applying the Gaussian filter to the image to generate a processed image; and
    c. a memory for storing the processed image.
21. The camera device of clause 20 wherein the box filter templates comprise at least two box filter templates of square and/or rectangular shapes wherein at least two box filter templates are configured in a row and a box filter template is configured below a leftmost box filter template in the row.
22. The camera device of clause 20 wherein a fast implementation of the box filter templates is used to configure an orientation of the set of filter templates.
23. The camera device of clause 22 wherein the fast implementation of the box filter template includes using a summed table.
24. The camera device of clause 23 wherein overflow computing is implemented in conjunction with the fast implementation of the box filter template.
25. A method of implementing a tunable Guassian filter programmed in a memory in a device comprising:
    a. configuring a set of at least two box filter templates of square and/or rectangular shapes, wherein the set of at least two box filter templates are oriented using a fast implementation of the box filter templates and overflow computing;
    b. iterating the set of at least two box filter templates to generate a Gaussian filter; and
    c. applying the Gaussian filter to an image to generate a filtered image.
26. The method of clause 25 wherein the set of at least two filter templates are configured in an orientation to generate a Gaussian filter between 0 and 45 degrees.
27. The method of clause 25 wherein the set of at least two filter templates are configured at an angle greater than 0 degrees and less than or equal to 45 degrees from each other.
28. The method of clause 25 wherein the set of at least two filter templates comprise at least two box filter templates are configured in a row and a box filter template is configured below a leftmost box filter template in the row.
29. The method of clause 25 wherein the fast implementation of the box filter template includes using a summed table.
30. The method of clause 25 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

31. An apparatus comprising:
   a. a processing component for processing an image by:
      i. configuring a set of at least two box filter templates of square and/or rectangular shapes, wherein the set of at least two box filter templates are oriented using a fast implementation of the box filter templates and overflow computing;
      ii. iterating the set of at least two box filter templates to generate a Gaussian filter; and
      iii. applying the Gaussian filter to the image to generate a filtered image; and
   b. a memory for storing the filtered image.

32. The apparatus of clause 31 wherein the set of at least two filter templates are configured in an orientation to generate a Gaussian filter between 0 and 45 degrees.

33. The apparatus of clause 31 wherein the set of at least two filter templates are configured at an angle greater than 0 degrees and less than or equal to 45 degrees from each other.

34. The apparatus of clause 31 wherein the set of at least two filter templates comprise at least two box filter templates are configured in a row and a box filter template is configured below a leftmost box filter template in the row.

35. The apparatus of clause 31 wherein the fast implementation of the box filter template includes using a summed table.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of implementing a tunable Gaussian filter programmed in a memory in a device comprising:
   a. configuring a set of filter templates; and
   b. iterating the filter templates to generate a Gaussian filter, wherein an area of the set of filter templates remains constant and is orientation independent, wherein the set of filter templates are configurable in a 45 degrees orientation, a less than 45 degrees orientation and an approaching 0 degrees orientation, wherein a position of a central filter template of the set of filter templates remains constant in each orientation.

2. The method of claim 1 wherein the set of filter templates are box filter templates.

3. The method of claim 1 wherein the set of filter templates are configured in an orientation to generate a Gaussian filter between 0 and 45 degrees.

4. The method of claim 1 wherein the set of filter templates are configured at an angle greater than 0 degrees and less than or equal to 45 degrees from each other.

5. The method of claim 1 wherein the set of filter templates comprise at least two box filter templates of square and/or rectangular shapes wherein at least two box filter templates are configured in a row, and a box filter template is configured below a leftmost box filter template in the row.

6. The method of claim 1 wherein a fast implementation of a box filter template is used to configure an orientation of the set of filter templates.

7. The method of claim 6 wherein the fast implementation of the box filter template includes using a summed table.

8. The method of claim 7 wherein overflow computing is implemented in conjunction with the fast implementation of the box filter template.

9. The method of claim 1 wherein the Gaussian filter is applied to an image to generate a filtered image.

10. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music device, a video player, a DVD writer/player, a high definition video writer/player, a television and a home entertainment system.

11. A system for implementing a tunable Gaussian filter comprising:
   a. a configuring hardware module configured for configuring box filter templates into an orientation, wherein an area of the box filter templates remains constant and is orientation independent, wherein the box filter templates are configurable in a 45 degrees orientation, a less than 45 degrees orientation and an approaching 0 degrees orientation, wherein a position of a central filter template of the box filter templates remains constant in each orientation; and
   b. an iteration hardware module configured for iterating the box filter templates to generate a Gaussian filter.

12. The system of claim 11 wherein the box filter templates are configured in an orientation to generate a Gaussian filter between 0 and 45 degrees.

13. The system of claim 11 wherein the box filter templates are configured at an angle greater than 0 degrees and less than or equal to 45 degrees from each other.

14. The system of claim 11 wherein the box filter templates comprise at least two box filter templates of square and/or rectangular shapes wherein at least two box filter templates are configured in a row, and a box filter template is configured below a leftmost box filter template in the row.

15. The system of claim 11 wherein a fast implementation of the box filter templates is used to configure an orientation of the box filter templates.

16. The system of claim 15 wherein the fast implementation of the box filter template includes using a summed table.

17. The system of claim 16 wherein overflow computing is implemented in conjunction with the fast implementation of the box filter template.

18. The system of claim 11 wherein the Gaussian filter is applied to an image to generate a filtered image.

19. The system of claim 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music device, a video player, a DVD writer/player, a high definition video writer/player, a television and a home entertainment system.

20. A camera device comprising:
   a. an image sensor configured for acquiring an image;
   b. a processor configured for processing the image by:
      i. configuring box filter templates at an angle greater than 0 degrees and less than or equal to 45 degrees from each other, wherein an area of the box filter templates remains constant and is orientation independent, wherein the box filter templates are configurable in a 45 degrees orientation, a less than 45 degrees orientation and an approaching 0 degrees orientation, wherein a position of a central filter template of the box filter templates remains constant in each orientation;

ii. iterating the box filter templates to generate a Gaussian filter oriented greater than 0 degrees and less than or equal to 45 degrees; and iii. applying the Gaussian filter to the image to generate a processed image; and c. a memory configured for storing the processed image.

21. The camera device of claim 20 wherein the box filter templates comprise at least two box filter templates of square and/or rectangular shapes wherein at least two box filter templates are configured in a row, and a box filter template is configured below a leftmost box filter template in the row.

22. The camera device of claim 20 wherein a fast implementation of the box filter templates is used to configure an orientation of the box filter templates.

23. The camera device of claim 22 wherein the fast implementation of the box filter template includes using a summed table.

24. The camera device of claim 23 wherein overflow computing is implemented in conjunction with the fast implementation of the box filter template.

25. A method of implementing a tunable Gaussian filter programmed in a memory in a device comprising:

a. configuring a set of at least three box filter templates of square and/or rectangular shapes, wherein the set of at least three box filter templates are oriented using a fast implementation of the box filter templates and overflow computing, wherein an area of the set of at least three box filter templates remains constant and is orientation independent, wherein the set of at least three box filter templates are configurable in a 45 degrees orientation, a less than 45 degrees orientation and an approaching 0 degrees orientation, wherein a position of a central filter template of the set of at least three box filter templates remains constant in each orientation;

b. iterating the set of at least three box filter templates to generate a Gaussian filter; and c. applying the Gaussian filter to an image to generate a filtered image.

26. The method of claim 25 wherein the set of at least three box filter templates are configured in an orientation to generate a Gaussian filter between 0 and 45 degrees.

27. The method of claim 25 wherein the set of at least three box filter templates are configured at an angle greater than 0 degrees and less than or equal to 45 degrees from each other.

28. The method of claim 25 wherein the set of at least three box filter templates comprises at least three box filter templates configured in a row, and a box filter template is configured below a leftmost box filter template in the row.

29. The method of claim 25 wherein the fast implementation of the box filter template includes using a summed table.

30. The method of claim 25 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music device, a video player, a DVD writer/player, a high definition video writer/player, a television and a home entertainment system.

31. An apparatus comprising:

a. a processing component for processing an image by:

i. configuring a set of at least three box filter templates of square and/or rectangular shapes, wherein the set of at least three box filter templates are oriented using a fast implementation of the box filter templates and overflow computing wherein an area of the set of at least three box filter templates remains constant and is orientation independent, wherein the set of at least three box filter templates are configurable in a 45 degrees orientation, a less than 45 degrees orientation and an approaching 0 degrees orientation, wherein a position of a central filter template of the set of at least three box filter templates remains constant in each orientation;

ii. iterating the set of at least three box filter templates to generate a Gaussian filter; and iii. applying the Gaussian filter to the image to generate a filtered image; and b. a memory for storing the filtered image.

32. The apparatus of claim 31 wherein the set of at least three box filter templates are configured in an orientation to generate a Gaussian filter between 0 and 45 degrees.

33. The apparatus of claim 31 wherein the set of at least three box filter templates are configured at an angle greater than 0 degrees and less than or equal to 45 degrees from each other.

34. The apparatus of claim 31 wherein the set of at least three box filter templates comprises at least two box filter templates configured in a row, and a box filter template is configured below a leftmost box filter template in the row.

35. The apparatus of claim 31 wherein the fast implementation of the box filter template includes using a summed table.

36. An apparatus comprising:

a. a processing component for processing an image by:

i. configuring a set of at least three box filter templates of square shapes;

ii. iterating the set of at least three box filter templates to generate a Gaussian filter; and iii. applying the Gaussian filter to the image to generate a filtered image; and b. a memory for storing the filtered image, wherein the set of at least three box filter templates are configurable in a 45 degrees orientation, a less than 45 degrees orientation and an approaching 0 degrees orientation, wherein a position of a central box filter template of the set of at least three box filter templates remains constant in each orientation.

* * * * *